Figure 1:
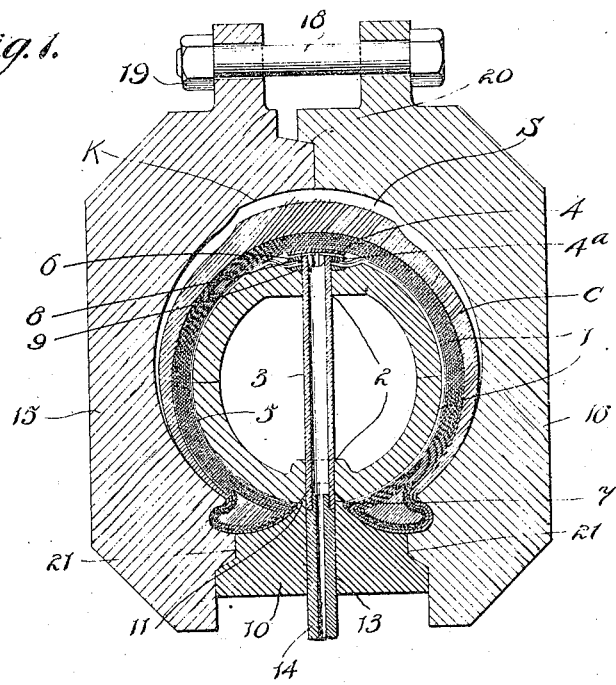

W. R. DENMAN.
METHOD OF BUILDING TIRE CASINGS.
APPLICATION FILED JULY 29, 1915.

1,176,885.

Patented Mar. 28, 1916.
2 SHEETS—SHEET 1.

Inventor:
Walter R. Denman
by Charles E. Parsons
Atty.

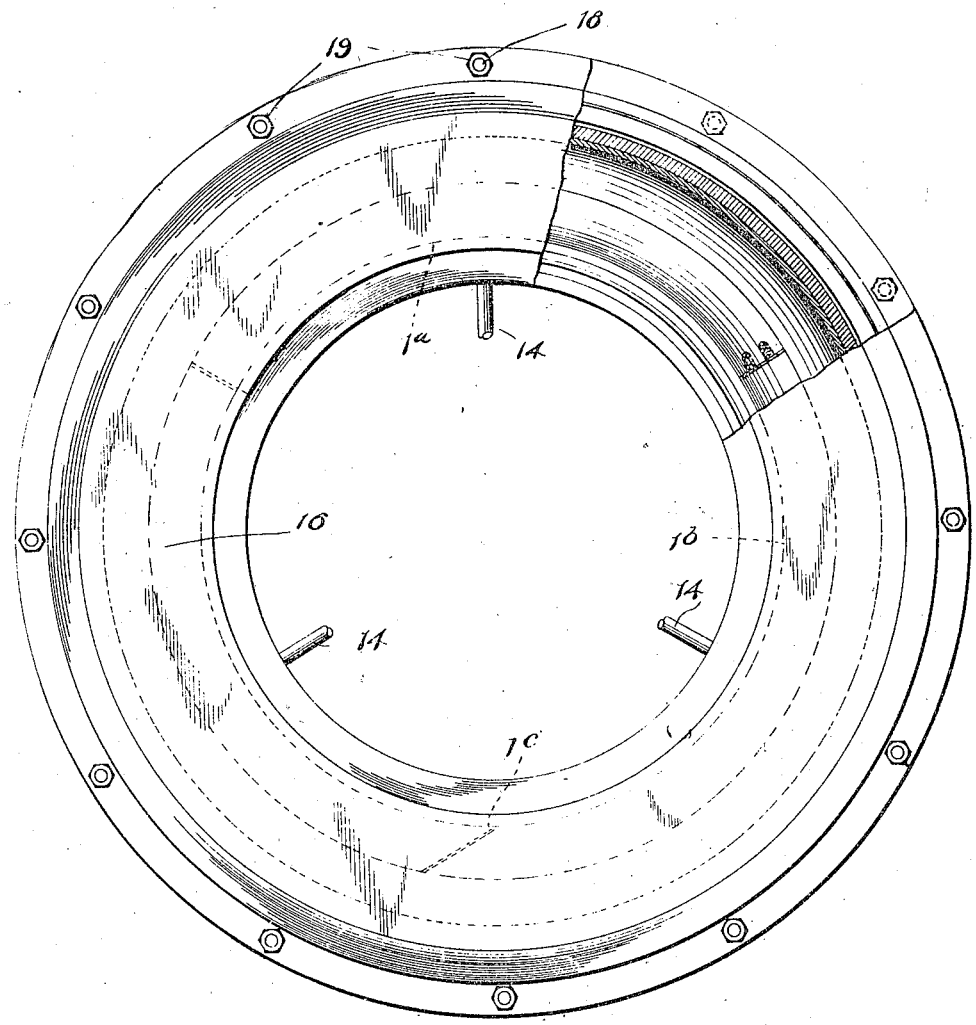

UNITED STATES PATENT OFFICE.

WALTER R. DENMAN, OF AKRON, OHIO, ASSIGNOR TO MILLER RUBBER COMPANY, A CORPORATION OF OHIO.

METHOD OF BUILDING TIRE-CASINGS.

1,176,885.  Specification of Letters Patent.  Patented Mar. 28, 1916.

Application filed July 29, 1915. Serial No. 42,620.

*To all whom it may concern:*

Be it known that I, WALTER R. DENMAN, citizen of the United States, residing at Akron, in the county of Summit and State of Ohio, have invented certain new and useful Improvements in Methods of Building Tire-Casings, of which the following is a specification.

The present invention relates to improvements in the manufacture of tire shoes or casings for pneumatic tires and pertains more particularly to an improved method of constructing such tire casings by means of the application of internal pressure during the vulcanizing process.

Tire casings for pneumatic tires are nearly all built up around an inner fabric or cord carcass. It is necessary that during the process of construction of the casing the flexible elements of the casing be either placed under tension, or be expanded, prior to the vulcanizing step.

It is the object of the present invention to provide a novel method of constructing pneumatic tire casings by subjecting the outer casing to an internal fluid pressure.

The invention consists in forming an outer tire casing with a flexible cord carcass formed about a hollow core through which fluid under pressure is adapted to pass, at the same time interposing confining means for the fluid, between the core and the casing and inclosing the whole within two mold halves. The internal pressure is then applied, between the tire and the confining means for the fluid, the vulcanizing takes place and the tire casing cured and finished with the proper degree of expansion having been effected, so as to insure the tire shoe against the dangers of subsequent excessive internal pressure and the numerous strains and stresses to which it is necessarily subjected in the ordinary course of use.

A still further object of the invention is to provide novel means for carrying out this method of tire construction, by means of which it is possible to wind the cord carcass upon the hollow core, build the tire casing about the carcass and expand the casing, thus formed with the proper amount of internal fluid pressure, during the vulcanizing step, all without removing the tire casing from the original hollow core. The object of this being to produce a much more perfect cord tire due to the fact that the raw tire is not disturbed by removing the core as in the former processes.

A still further object which is attained by the present invention is the provision of a more economical and efficient form of inner collapsible core, which does not have to be sealed at its several joints as is done in other cases.

With this and other objects in view, the invention consists in the combination and arrangement of parts hereinafter set forth in the following specification, illustrated in the accompanying drawings and pointed out in the appended claims.

Figure 2:
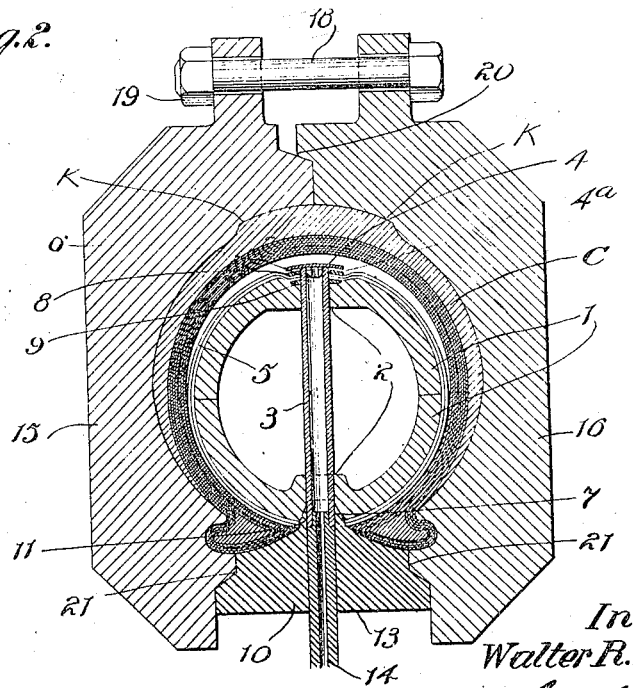

In the drawings; Figure 1 is a transverse sectional view showing a tire casing in the process of construction according to the manner of the present invention. Fig. 2 is a similar view showing the tire casing in its expanded position. Fig. 3 is an enlarged side elevation of the mold, partly broken away to expose the core within.

Referring now to the drawings, the cord carcass of the tire is wound about a hollow collapsible, two-part core 1, which is substantially circular in cross section. This hollow winding core is composed of a plurality of inner and outer sections, each comprising a number of interlocking segments $1^a$ and $1^b$ respectively, certain of which are provided with inclined edges $1^c$. The hollow collapsible core is similar to the one described in application on which a patent was granted me February 1st, 1916, No. 1,170,423.

The hollow core segments are provided with cylindrical bores 2 formed in the inner and outer sides thereof at diametrically opposite points. When the collapsible core 1 is assembled and before the cord carcass C has been wound thereon, valve stems 3 are inserted in the segments registering in the cylindrical bores 2. The valves stems 3 are straight pieces of piping each formed of a single piece adapted to extend transversely through the hollow core from its inner periphery to its outer surface. At the outer ends of the valve stems self-closing valves 4 are provided, having circular inlet openings $4^a$ beneath the valve disks 4 through which the fluid under pressure is adapted to be discharged, as will be hereinafter described. A fluid tight tubular casing 5 of rubber or rubber coated canvass is placed over the outer surface of the assembled core 1 and is provided with openings 6 and 7 for the ends of the valve stems 3. At the outer end of each valve stem 3 the tubular casing 5 is retained between two circular washers 8 and 9.

The cord carcass is formed on the core 1 by spirally winding a plurality of superimposed plies of parallel cords completely about the core, and the tire casing is completed by splitting the carcass thus formed along its inner periphery, separating the plies of cord at either side of the opening, inserting bead cores at suitable places, and adding the necessary portions for the tread and sides. A central sectional ring 10 is now assembled and secured along the inner circumference of the ring core 1, being provided with lugs or projections 11 engaging with correspondingly shaped orifices along the surface of the core. The ring 10 is formed with circular channels or bores 13 through which tubes or pipes 14 extend and have screw threaded connection with the valve stems 3. The pipes 14 are individually or collectively coupled with a suitable source for supplying hot water or other fluid under pressure. The two mold halves 15 and 16 are next applied about the tire casing and are bolted together by means of the bolts 18 and nuts 19. The mold halves are formed with an interlocking joint 20 above the tire shoe and are adapted to have a tongue and groove connection with the ring 10 below the tire casing as shown at 21. The inner surfaces of the mold halves 15 and 16 are hollowed out to correspond exactly at the bottom with the bead, or clencher part of the tire and are formed with the same shape and contour as the outer surface of the finished casing. The inner area of the mold halves is slightly greater at the top and sides than the exterior of the unvulcanized tire shoe or casing, thus a space S is left between the tire casing C and the inner surface of the mold halves 15 and 16.

When the parts have all been assembled the fluid pressure is turned on in the pipes 14 and valve stems 3 so that hot water or steam under pressure is discharged through the inlet openings 4ᵃ between the inner surface of the tire shoe and the fluid tight tubular casing 5. This inrush of fluid under pressure is continued while the whole is placed in the vulcanizing pot and the vulcanizing heat applied. The tube 5 serves the purpose of confining the pressure for expanding the tire casing equally in all directions and furthermore forms a practically water tight covering over the several joints and irregularities that may be present in the outer surface of the collapsible core 1.

The tire casing is expanded and pressed into the cavity or space S as shown in Fig. 2. The sides of the casing and the inner sides of the mold halves form tight sealed joints at the points K.

By constructing a tire casing according to the present method it is possible to wind the cord carcass, build the casing and expand the same under the desired pressure, then vulcanize the whole without removing the original carcass from the winding core.

The use of the inner fluid tight tubular member 5 insures the equal distribution of the fluid pressure between the hollow collapsible core and the inner surface of the tire casing.

What I claim is:—

1. The method of making pneumatic tire casings, which consists in forming a casing structure of flexible cord and raw rubber about a collapsible metal ring core, having a fluid tight tubular element around its outer surface, thereafter placing the cords of said casing under uniform tension, to approximately the limit of elasticity by applying pressure internally of said structure between said tubular member and the tire casing and vulcanizing the casing in its expanded position.

2. The method of making pneumatic tire casings, which consists in forming a cord carcass about a ring core having a fluid tight tubular cover thereon, building a rubber casing on said carcass, placing the whole between mold members having an internal cavity larger than the raw rubber casing, expanding the casing by applying fluid under pressure between said tubular cover and the interior of the casing and finally vulcanizing the casing in its expanded position.

3. The method of making pneumatic tire casings which consists in forming a cord casing about a collapsible metal ring core having a flexible fluid tight tubular cover thereon, placing the whole between mold members having an internal cavity larger than the casing, expanding the casing by applying fluid under pressure between the flexible tubular cover and the interior of the casing and lastly vulcanizing the casing in its expanded position.

In testimony whereof I affix my signature in presence of two witnesses.

WALTER R. DENMAN.

Witnesses:
C. A. WOLF,
H. M. WILSON.